(No Model.)
E. A. RUSSELL.
BOILER WATER PURIFIER.
No. 352,630. Patented Nov. 16, 1886.
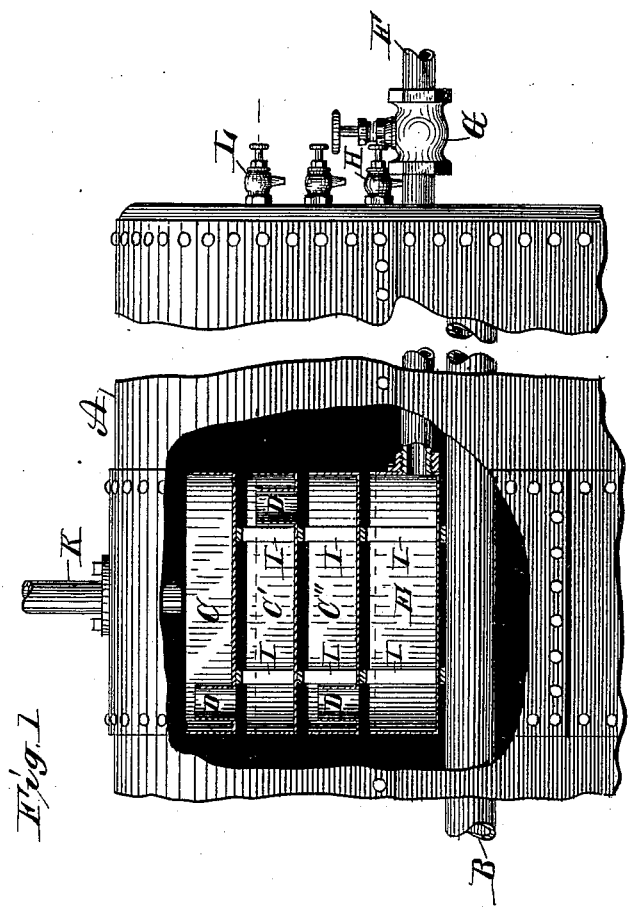
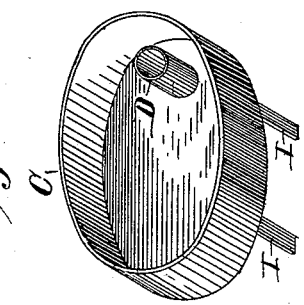
Witnesses
G. M. Gridley
E. R. Inman
Inventor
Edmund A. Russell
By Ermin Benedict
Attorneys

UNITED STATES PATENT OFFICE.

EDWARD A. RUSSELL, OF MILWAUKEE, WIS., ASSIGNOR OF TWO-THIRDS TO HENRY J. DELANEY AND ROBERT GILJOHAN, BOTH OF SAME PLACE.

BOILER WATER-PURIFIER.

SPECIFICATION forming part of Letters Patent No. 352,630, dated November 16, 1886.

Application filed March 22, 1886. Serial No. 196,072. (No model.)

*To all whom it may concern:*

Be it known that I, EDWARD A. RUSSELL, of Milwaukee, in the county of Milwaukee and State of Wisconsin, have invented new and useful Improvements in Boiler Water-Purifiers; and I do hereby declare the following to be a full, clear, and exact description of said invention, reference being had to the accompanying drawings, and to the letters or figures of reference marked thereon, which form a part of this specification.

The object of my invention is to provide a device for use in steam-generating boilers, in which device the mud, sediment, and other foreign matter in the water will be collected and may be removed from time to time as shall be necessary.

My device will be fully understood by the following description, with a reference to the drawings, in which—

Figure 1 is a vertical central section of my device located in a horizontal tubular boiler, the side of which boiler is broken away to show my device in position. Fig. 2 is a top perspective view of one of the pans forming a part of my device.

The same letters refer to like parts in both views.

My water-purifying device consists, essentially, of a series of peculiarly formed and constructed pans located one above another within a boiler, into and through which pans the water must pass as it enters the boiler.

In Fig. 1, A is the shell or case of the boiler, and B is one of the top tubular flues in the boiler.

Of the pans forming the water-purifier all but the bottom one are constructed alike. The upper pans, C C' C'', of which there may be one or more, have each a flat bottom and perpendicular sides, and is preferably of elliptical form, open at the top, and is provided with an aperture through its bottom near one end, around which aperture and extending upward from the bottom of the pan is a tube, D, the aperture through which is continuous with the aperture through the bottom of the pan, forming a discharge-pipe from the pan, and the tube is rigid to the bottom of the pan, closing the apertures through the bottom of the pan otherwise than through the tube. This tube D is not quite so tall as the height of the sides of the pan, so that water poured into the pan will when the pan sets level be discharged through the pipe D before it rises high enough to overflow the sides of the pan.

The bottom pan, E, has no discharge-pipe corresponding with the pipe D in the other pans, but has a tight bottom, and is provided with a blow-off pipe, F, opening from it near the bottom, and leading out of the boiler into the sewer or open air, which blow-off pipe is furnished with a stop-cock, G, as is used with blow-off pipes.

The bottom pan, E, is supported in the boiler on the flues or on brackets, as may be convenient, near or at the low-water mark in the boiler opposite the gage-cock H, and the other pans, C, C', and C'', are located in a series one above the other directly over the pan E at a little distance from each other, so as to allow passage of water and steam between them, and are preferably supported one upon another by short legs I I, affixed to the bottom of each of the upper pans, which legs stand upon the bottom of the pan immediately below, the pans being so arranged with reference to each other that the discharge-tubes D D are at alternate ends of successive pans.

Water is let into the boiler through the pipe K, which leads directly into the top pan, C, and the heavier and principal sediment will be deposited on the bottom of the top pan, C, and the water when at the top of the tube D in the top pan will run over down into the second pan, C', in which a further deposit of sediment (if any in the water) will take place; and in the same manner the water will overflow into the succeeding pans to the bottom one, and if any sediment accumulates in the bottom pan it can be blown off through the pipe F from that pan from time to time by opening the cock G when steam is on in the boiler.

The upper pans, C C' C'', may be removed from the boiler through the man-hole and the sediment cleaned out as often as is necessary.

Water may be introduced into the boiler to the high-water line opposite the high-water gage-cock L without interfering with the working of this device, as the sediment in the pans will not be disturbed by the surrounding water outside the pans.

What I claim as new, and desire to secure by Letters Patent, is—

1. A boiler-water purifier consisting of a series of pans supported one above another within a steam-generating boiler, each of such pans above the bottom one being provided with a discharge-pipe extending upwardly from the bottom of the pan nearly as high as the sides of the pan, a bottom pan having a blow-off pipe leading from its bottom, and an inlet-pipe discharging water into the top pan, substantially as described.

2. The combination, within a steam-generating boiler, of a series of pans, C C' C", each provided with an upwardly-extending discharge-pipe, D, superimposed upon a bottom pan, E, provided with blow-off pipe F, and an inlet-pipe, K, leading into the top pan, substantially as described.

In testimony whereof I affix my signature in presence of two witnesses.

EDWARD A. RUSSELL.

Witnesses:
C. T. BENEDICT,
E. R. INMAN.